United States Patent [19]

McArdle et al.

[11] Patent Number: 5,073,219
[45] Date of Patent: Dec. 17, 1991

[54] METHOD OF AND APPARATUS FOR MAKING OPTICAL STORAGE DEVICES

[75] Inventors: Ciaran B. McArdle, Dublin, Ireland; Michael G. Clark, Gerrards Cross, England; William R. Beck, Wooddale, Ill.; Carolyn Bowry, Wembley, England

[73] Assignee: The General Electric Company, p.l.c., England

[21] Appl. No.: 424,256

[22] PCT Filed: Feb. 17, 1989

[86] PCT No.: PCT/GB89/00173
§ 371 Date: Dec. 11, 1989
§ 102(e) Date: Dec. 11, 1989

[87] PCT Pub. No.: WO89/07821
PCT Pub. Date: Aug. 24, 1989

[30] Foreign Application Priority Data

Feb. 19, 1988 [GB] United Kingdom ................ 8803923

[51] Int. Cl.$^5$ .................... B32B 31/12; G02F 1/1337
[52] U.S. Cl. ........................ 156/242; 118/39; 118/42; 118/45; 118/112; 118/118; 118/123; 118/640; 118/712; 118/DIG. 4; 156/267; 156/269; 156/272.4; 156/272.6; 156/273.3; 156/274.6; 156/308.2; 156/309.9; 156/324; 156/379.6; 156/390; 156/501; 156/510; 264/1.3; 264/1.4; 264/1.7; 264/24; 264/135; 264/160; 264/161; 264/171; 264/216; 264/237; 264/294; 264/297.1; 425/135; 425/174.8 E; 425/302.1; 425/308; 427/26; 427/108; 427/162; 427/358; 427/359; 427/412.3; 427/412.5; 428/1; 359/36; 359/77; 359/78; 359/103; 359/104

[58] Field of Search ............... 264/1.1, 1.3, 1.4, 1.6, 264/1.7, 1.9, 22, 24, 40.2, 108, 129, 134, 135, 160, 161, 171, 216, 232, 237, 294, 297.1, 345, 348; 425/3, 174, 174.8 E, 135, 302.1, 308; 427/26, 162, 163, 358, 359, 412.3, 412.5, 108, 293; 118/39, 42, 45, 112, 118, 123, 640, 712, DIG. 4; 156/242, 267, 269, 272.4, 272.6, 273.3, 274.6, 308.2, 309.9, 324, 379.6, 390, 501, 510, 47; 350/330, 340, 341, 350 R, 350 S, 339 R

[56] References Cited

U.S. PATENT DOCUMENTS

| 3,941,901 | 3/1976 | Harsch | 427/163 X |
| 4,668,448 | 5/1987 | Weber et al. | 264/22 |
| 4,702,558 | 10/1987 | Coles et al. | 350/330 |
| 4,810,338 | 3/1989 | DeMartino et al. | 427/162 X |
| 4,810,433 | 3/1989 | Takayanagi et al. | 264/22 |

FOREIGN PATENT DOCUMENTS

| 141512 | 5/1985 | European Pat. Off. |
| 171045 | 2/1986 | European Pat. Off. |
| 52-37455 | 3/1977 | Japan | 350/340 |
| 57-42019 | 3/1982 | Japan | 350/340 |
| 62-199863 | 9/1987 | Japan | 264/24 |
| 63-170485 | 7/1988 | Japan |
| 1201230 | 8/1970 | United Kingdom |
| 1387276 | 3/1975 | United Kingdom |
| 2146787 | 4/1985 | United Kingdom |

Primary Examiner—Leo B. Tentoni
Attorney, Agent, or Firm—Kirschstein, Ottinger, Israel & Schiffmiller

[57] ABSTRACT

In a process for mass producing optical storage sheets, an elongate film of a liquid crystalline material is fed lengthwise along a path through an aligning gate. The aligning gate applies to successive areas of the film a field which aligns the molecules. The field may be an electric field and/or a shear field. An aligning layer, such as a surfactant layer may also be used for alignment of the film areas. The aligned film may then be cut into pieces for use as microfiches or microfilms. The film material is preferably a liquid crystal polymer material.

40 Claims, 1 Drawing Sheet

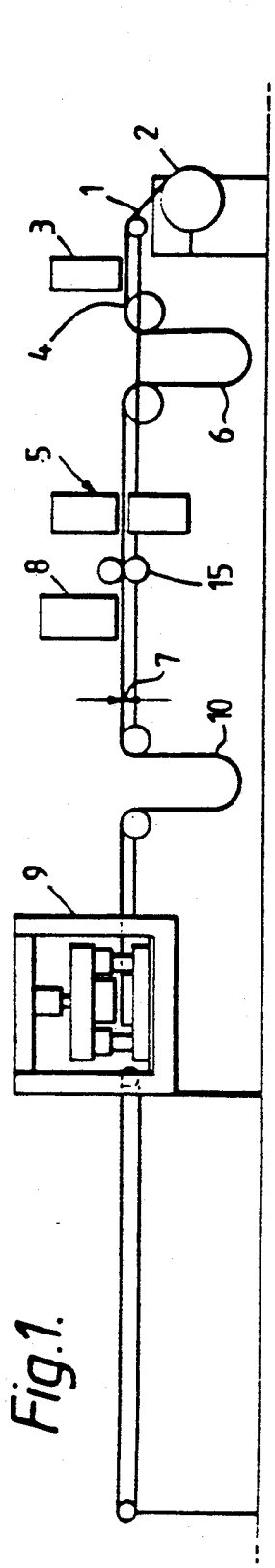
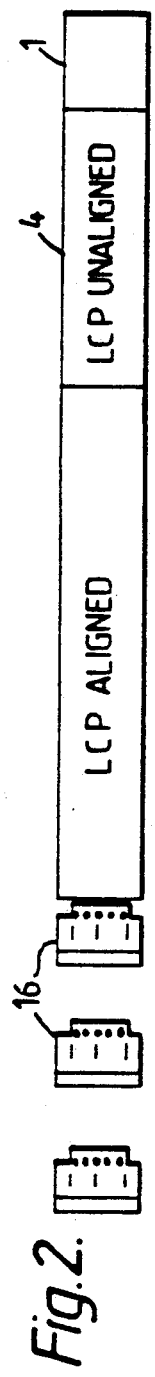
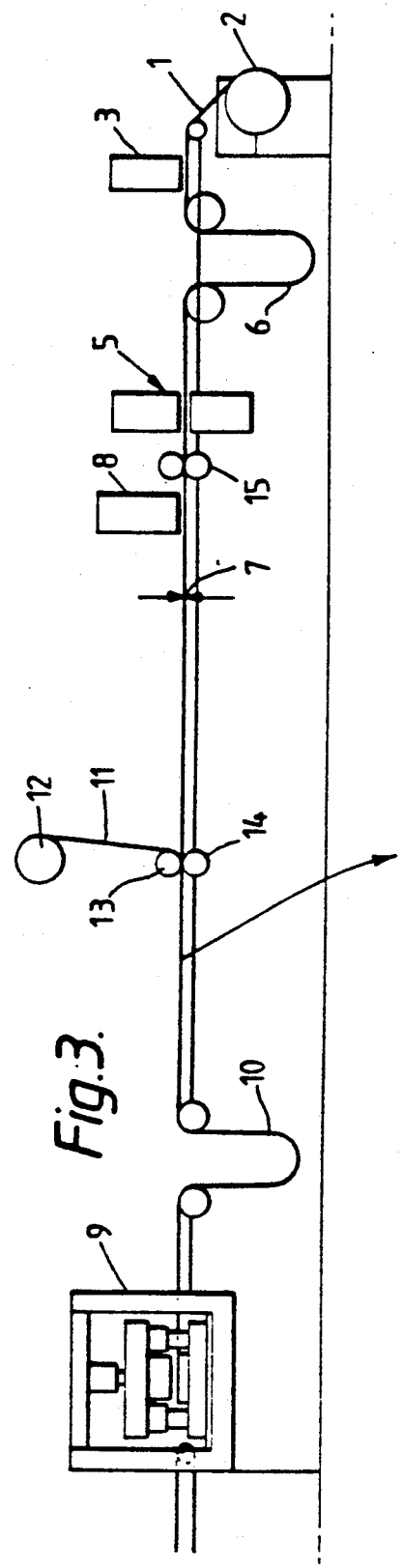

METHOD OF AND APPARATUS FOR MAKING OPTICAL STORAGE DEVICES

BACKGROUND OF THE INVENTION

1. Field of the Invention

This invention relates to a process and apparatus for manufacturing optical storage devices such as microfilms, microforms and microfiches, and also larger recording media, such as A4 size sheets, using liquid crystalline materials.

2. Description of Related Art

Liquid crystals, in general, are unique materials which exhibit anisotropy of various physical properties, including refractive index and dielectric susceptibility. These properties allow liquid crystal (LC) materials to be controlled by electric fields and thereby to provide the responses commonly found in liquid crystal displays (LCDs).

Liquid crystal polymer (LCP) materials are a specific class of liquid crystal materials which exhibit these properties and additionally exhibit the potential advantages of conventional polymer materials, such as mechanical integrity and ease of processing. However, they have not been used in LCDs because they have a sluggish response to electric fields due to their high viscosity, even when heated.

It is known that LCP materials can be used as thermo-optic and photo-optic storage media. The application of LCPs in the area of optical recording is of particular interest and these electro-responsive materials further offer the prospect of erasability in recording media. While it is known that certain classes of low molar mass (non-polymeric) LCs, e.g. smectic A cyanobiphenyl mixtures, can also be implemented in erasable optical storage elements, the readily-available glassy phases, the high viscosity and the different handling properties available in the case of LCP materials make these materials particularly attractive. For example, with regard to a film-based product, the low molar mass smectic A LC storage media are useless, in spite of the fact that the technology for thin flexible plastic LCD production is already well known. This is so because of the limited viscosity range available in such media. Hence, when smectic A LC media are confined in flexible LCD formats, such as might be required in a micrographics application, and are then stressed mechanically, the data written thereon is corrupted due to the formation of scattering textures. These scattering textures originate at the source of the deformation and propagate across the recording field. Used in a rigid configuration in which they are contained between glass plates, on the other hand, these materials offer very high performance and have been successfully used in ultrahigh resolution displays and artwork generators.

Unlike conventional LCs, LCP materials are high molecular weight materials which possess many of the properties of the actual plastics substrates which are used in plastic LCD manufacture. These electroactive polymers are thus more compatible with such substrates, particularly when correctly engineered with respect to their phase behaviour. The scope for molecular engineering is a further advantage of LCP materials, this scope being broader than for the low molar mass materials, since polymers can be copolymerised, cross-linked, plasticised and form interpenetrating networks, etc. Furthermore, because of the size of their molecules, LCPs do not possess the powerful solvent characteristics exhibited by conventional LC materials, which present problems when using organic substrates.

Although advantages of LCPs for optical recording applications have been identified, some fundamental problems exist in their use. The production of high optical quality LCP film of the purity which the electronics industry demands is difficult to achieve. The occurrence of pinholes and impurities in LCP films is detrimental to their operation under electric fields, and results in increased power consumption and ultimately in power shortage. For example, a major class of side chain LCP materials often suffers from contamination by colloidal metal particles as a result of the catalytic system used in their synthesis. In the liquid crystal polymer field, therefore, conventional LCD techniques have been used just to prepare samples, by alignment of small areas, for subsequent experimental evaluation. The LCP materials have been melted and capillary filled, possibly under vacuum, for such evaluation. The conventional processing techniques which are convenient in polymer technology and which are solvent-assisted, such as spin and dip coating, have previously not been used in forming samples where subsequent application of electrical fields for accessing has been needed. Solvent-assisted techniques have been used, however, in cases where electrical accessing is not required, for sample preparation of write-once LCP optical disks employing a photooptical recording mechanism, for a thermally-erasable film-based product addressed by thermal print heads for so-called "optical whiteboard" applications, and for a write-once photo-optical recording self-supporting film.

To provide electrical access to an LCP film device it would be necessary to provide two substrates, one on each side of the active LCP layer, which also incorporate the optically transparent electrodes. For use in specific applications, such as in micrographics, for example in forming microfiches, thick devices would not be acceptable, because the storage capacity per unit volume would be degraded as a result of the thickness. Furthermore, the use of thick substrates of, say, 200 $\mu$m thickness would make contact duplication processes difficult and degrade the quality of duplicated microforms produced from a master. For other applications, however, thicknesses of up to 400 $\mu$m or more might be tolerated.

Irrespective of whether the thickness can be accepted, the problem of initialising the recording condition during manufacture of the film to produce a laser addressable thermo-optic autodeveloping device has not previously been resolved.

Furthermore, it is necessary to differentiate between two types of LCP devices which would be applicable in the micrographics field. A first device is a write-once device, as mentioned above, which is updatable only and requires no electrical access and must be as thin as conventional microfiche products. It is not possible to form a laminate with electrodes on opposite sides, to align the polymer using an electric field, and then to remove one of the electrodes to render the device no longer electrically accessible.

A second device requires a double-sided laminate confining the LCP so that electrical access is possible for implementing an edit function. Again it has not previously been possible to initialise the recording condition.

SUMMARY OF THE INVENTION

It is an object of the present invention to provide a mass production process which enables the manufacture of optical storage films of relatively large areas of liquid crystal polymer materials despite the above-mentioned inherent deficiences of polymer materials. If provided with the necessary electrodes, the films may be subsequently electrically accessed.

According to one aspect of the invention there is provided a process for the manufacture of a plurality of optical storage sheets, comprising the steps of providing an elongate film of a liquid crystalline material; and feeding said elongate film lengthwise along a path from a first location to a second location whereby areas of the film are fed successively past aligning means positioned between said first and second locations, the aligning means being operative to apply a field to each successive area of the film to align the molecules of the liquid crystalline material in that area.

The process enables films of LCP materials which may be impure and/or contain pinholes to be initialised into an optically clear condition which is necessary for the thermo-optical recording mechanism and which allows positive contrast writing.

According to another aspect of the invention there is provided apparatus for manufacturing a plurality of optical storage sheets, comprising a feed path for receiving an elongate film of liquid crystalline material; aligning means positioned between first and second locations along said feed path; and means to feed the elongate film lengthwise along said path from said first location to said second location whereby areas of the film are fed successively past said aligning means; the aligning means being operative to apply a field to each successive area of the film to align the molecules of the liquid crystalline material in that area.

BRIEF DESCRIPTION OF THE DRAWINGS

Embodiments of the invention will now be described, by way of example, with reference to the accompanying drawing, in which FIG. 1 is a schematic pictorial view of apparatus for the mass production of one type of optical storage device, FIG. 2 is a schematic plan view illustrating stages in the mass production of that type of device, FIG. 3 is a schematic pictorial view showing a modification of part of the apparatus of FIG. 1, for the mass production of a second type of optical storage device, and FIG. 4 is a plan view of part of a storage medium at one stage in the operation of the apparatus of FIG. 3.

DETAILED DESCRIPTION OF THE PREFERRED EMBODIMENTS

Referring to FIG. 1 of the drawings, a strip 1 of a flexible transparent plastics material, such as polyethylene terephthalate (PET), is drawn from a roll 2 of the material and is passed through a coating unit 3 which deposits on the strip a thin film 4 of a liquid crystal polymer. Preferably the thickness of the strip 1 is around 100–150 $\mu$m and that of the film 4 is in the range of 1–10 $\mu$m, and preferably around 5 $\mu$m. The thinness of the overall construction is important when the combined strip and film is to be used as an optical mass storage medium. It should then be of the minimum acceptable thickness so as to allow the maximum storage capacity per unit volume when sheets of the material are stacked up, but it must, on the other hand, be sufficiently thick to be easily handled.

The film 4 may be formed by applying a liquid crystal polymer/solvent solution to the strip 1 using a doctor blade, the strip being held under tension during the application of the solution. The solvent must, of course, be selected such that it does not attack the strip 1. The film is subsequently dried. It is important that the temperature of transition of the LCP to the molten state be less than the melting temperature of the substrate for subsequent processing. The coated strip 1 is then fed to an aligning gate 5. The feeding can be effected in a continuous mode or in a non-continuous mode of, for example, step and repeat stages or even individual fixed formats. A loop 6 of the strip acts as a buffer between the continuous feeding from the reel 2 and the intermittent passage through the aligning gate. The aligning gate is capable of generating a field which aligns the LCP material.

The aligning gate may be a magnetic head which produces a high-intensity magnetic field and which may comprise heated pole pieces. Alternatively, a separate heater may be provided at the aligning gate. The separation of the pole pieces is adjustable over a range from zero separation to, say, 500 $\mu$m separation, so that an intense field can be impressed on the thickness of the film 4. Normal operation would require a pole piece clearance of some 5 $\mu$m above the LCP layer. The pole pieces could contact the film as in a conventional cassette tape recorder. Following the aligning gate there is a chill roller arrangement 15 to quench the aligned LCP material while the magnetic field is still applied, or just after it has been removed, to ensure that the material retains its aligned condition.

The aligning gate 5 could alternatively or additionally apply an electric field to the LCP film to align it. Such a gate could comprise means to produce a corona discharge over the film. For this purpose it would be necessary to provide an electrically-conductive layer (not shown) between the strip 1 and the LCP film 4. Such a layer may be formed of a transparent material, such as indium tin oxide. The layer would be connected to one terminal of a high-voltage (e.g. 5–10 kV) supply via a stationary contact engaging with an edge of the layer. A stationary electrode (not shown) which is connected to the other supply terminal would be positioned close to the opposite surface of the film. The film 4 would be heated into the liquid crystal phase and the corona discharge would then be initiated to align that area of the LCP material which is at the aligning gate. The alignment would be retained by the LCP film as it cools. The corona discharge could be maintained while the LCP material is cooling.

Alternatively, or additionally, the aligning gate 5 could apply a shearing field to the LCP film 4. This could be effected by a stationary blade (not shown) extending across the width of the film and in contact therewith, or by one or more heated rollers (not shown) in contact with the film and rotating in the opposite direction to the direction of feeding of the strip 1 through the aligning gate. The LCP material must be heated into the liquid crystal phase. Preferably it will be heated to a temperature at which it is close to the isotropic phase, so that its viscosity is reduced.

Alignment can alternatively, or additionally, be achieved by providing surface aligning layers (not shown). As regards liquid crystal polymer materials, it is easier to align them homeotropically than homogeneously. This alignment can be effected by the use of surfactants such as lecithin, or polymers such as polydimethylsiloxane or polystyrene. Before deposition of the film 4 thereon, a coating of the surface aligning layer 5 can be deposited on the strip 1 by means of, for example, a doctor blade, the aligning layer preferably being in solution. A second strip with an aligning layer on its underside must then be affixed over the film 4, so that the film is laminated between two such aligning layers. The aligning gate must include means to heat the LCP film into the isotropic phase. The film must then cool slowly, and the chill roller arrangement 15 would not be required.

If the LCP material of the film 4 has a high glassy phase transition temperature, i.e. above room temperature, a pseudo-alignment condition can be obtained by heating the material into the isotropic phase and then quench cooling it into the glassy phase. The material thereby remains in the isotropic phase, and a clear film is produced. This operation can readily be effected by a heating roller at the aligning gate, followed by a cooling roller.

By using non-electrical alignment, impure LCP samples, which were previously considered unsuited to large area device application, can now be fully utilised. The strip 1 taken from the roll 2 is slightly wider (perhaps by 5 mm or so) than the width of standard microfiches, microfilms, etc. which are to be formed. After the aligning stage, the excess material is trimmed off by cutters 7 and the LCP coating on the excess material is subsequently recovered by solvent extraction. This procedure will be necessary if the alignment occurs in a step and repeat operation, and melting of the LCP material in the alignment zone might cause edge deformation.

The apparatus can be refined to produce an electric or magnetic field under a thermal gradient to ensure best alignment on cooling the LCP material. Furthermore, the transformation from the unaligned condition to the aligned condition is accompanied by a change from an optically scattering and opaque state to a clear transparent state. This process is easily monitored by simple LED/photodiode pairs on opposite sides of the film, and order parameter data can be computed to provide quality control. The write-once film requires subsequent protection with an overcoat of, for example, a cross-linked siloxane, deposited by a unit 8. The deposition can be effected by any suitable method.

The overcoated strip can then be passed to a die 9 which cuts the strip into required shapes, such as A6-size microfiches. A buffer loop 10 is provided between the unit 8 and the die 9.

FIG. 2 illustrates the various stages between taking the strip 1 off the roll 2 and passing finished blank microfiches 16 out for inspection. The process described can be completely automated. Furthermore, the process is entirely compatible with proprietary conversion equipment which is already used in the manufacture of transparent electro photographic (TEP) microforms, so that the simple addition of an alignment gate and, where necessary, a heater to the conventional production line, and the use of LCP materials, gives rise to a new product. The process is suitable for use even with LCP materials which are not especially pure. The alignment gate can be removed from the production line or merely made ineffective whenever conventional TEP microfiches are required.

The device can be addressed by a digital laser technique, allowing its use in electronic mailing and remote updating and, furthermore, it is autodeveloping. It can act as an archive and will comply with all the legally-accepted standards of conventional microfiches, provided that the LCP is correctly molecularly engineered. Furthermore, non-electric aligning processes obviate the necessity to use a plastics materials coated with a transparent conductor, such as indium tin oxide, as opposed to the well standardised base materials, such as PET, which are already used in micrographic products.

For the manufacture of an alternative optical storage sheet, which can be electrically accessed, the same technique is used to establish the initial transparent condition, but, in this case, the strip 1 is initially provided on one side with an optically transparent and flexible electrode formed, for example, from indium tin oxide. A second electrode is provided on the other side of the strip in a further lamination process following the edge shaping unit 7. This process is shown in FIG. 3, in which a plastics film 11, coated with indium tin oxide, is drawn from a roll 12 and is fed with the strip 1 between rollers 13,14. The top and bottom electrodes are offset relative to each other to provide contact overhangs, as shown in FIG. 4.

It will be apparent that the format need not be the A6 microfiche format. Furthermore, in any of the described configurations, the base electrode may have a coating of, for example, aluminium to provide a reflective rather than a transmissive product. Still further, both electrodes may be metal-coated, which will make the active LCP medium invisible to the human eye. Laser addressing in this case can still be implemented by absorbing laser energy into the metal layer, which is suitably coated with one or more dielectric antireflecting layers in thermal contact with the LCP material. Such a recording medium would form a security device which can be read out only magnetically or electrically, as the case may be, by scanning it with a head which is sensitive to the changes in magnetic permeability or dielectric permeability or spontaneous polarisation if the material is ferroelectric, so that written and unwritten areas can be mapped.

In these alternative embodiments, selective erasure can be implemented by application of an electric field to the written LCP film. The problem of applying an electric field to perform this function is not severe in this case, since the written area to be heated by the laser and simultaneously subjected to a field is very small compared to the case where an entire storage sheet must be heated and then subjected to an electric field. Furthermore, the chances of shorting are negligible. Bulk reinitialisation to the completely clear state in all of the finished devices can be achieved by an erasing head which will provide the necessary alignment field and heat. Such an eraser may be marketed for use by the user of the optical records. Alternatively, this erasing operation may be provided as a service by the equipment manufacturers.

A suitable laminate structure for forming an erasable device can be produced by using a transparent adhesive layer, such as a UV-curable epoxy resin. The example, a layer of UV-curable epoxy may be deposited on the strip 1 and on another substrate strip, and the two coated strips with the LCP film 4 between them are then laminated together by curing the epoxy by exposure to UV light. The epoxy adhesive layers also act as barrier layers over the electrode layer and thereby prevent Schottky injection and the build-up of electrical charge at the electrodes. The adhesive layers therefore help to prevent the occurrence of shorting in the film when the erase field is applied. The structure may be used for selective or bulk erasure.

When electrically or magnetically aligned, the liquid crystalline moieties can be homeotropically or homogeneously aligned. The liquid crystalline moieties inherent in the LCP material structure (as side chains or otherwise) may be of positive or negative diamagnetic susceptibility ($\Delta\chi$) and/or dielectric anisotropy ($\Delta\epsilon$), and so may align parallel or perpendicular to the applied field. For example, cyanobiphenyl LC moieties of positive dielectric anisotropy $\Delta\epsilon$ also possess positive $\Delta\chi$ and will align parallel to a magnetic field or an electric field, producing an initial homeotropic optically uniaxial state ready to receive information. There are LC moieties which have positive $\Delta\epsilon$ but have cyclohexyl core units, for example, and hence have negative $\Delta\chi$. In this case the initial condition of the film when magnetically aligned is homogeneous and still transparent, but is homeotropic if electrically aligned. To ensure that the homogeneous alignment is uniform, it is necessary to favour one direction e.g. by mechanically induced alignment (stretching, doctor blade) or by tilting the field. This is one example of a particularly favourable orientation since pleochroic dyes, which are incorporated to absorb laser radiation, will also be aligned homogeneously by the guest-host effect. In this orientation a considerable gain in film recording sensitivity is attained when linearly polarised lasers are used. This latter type of material is well suited to write-once operation, but not to erasable operation as the $\Delta\epsilon$ parameter is in the wrong sense. By molecular design, for example by using a terminal methoxy group in a cyclohexyl structure, both negative $\Delta\epsilon$ and negative $\Delta\chi$ can be obtained. This type of material is then well-suited to both write-once and erasable products. However, a negative $\Delta\epsilon$ material will also require one direction to be favoured when a field is applied. This is more difficult to achieve, and such materials are less favourable.

The write-once device is also useful for other reasons. The thin recording film, of around 5 $\mu$m thickness, is in direct contact with an insulator, namely the plastics substrates strip 1, rather than with a metal or indium tin oxide electrode. Hence, in laser addressing of this device, improved resolution can be achieved, since heat loss to a good conductor is avoided.

The process described allows a variety of other devices to be configured. For example, in erasable devices the alignment step is used as described to produce an oriented film on, say, an indium tin oxide substrate. A further processing step might involve direct metallisation on to the LCP layer or sputtering of indium tin oxide on to the LCP layer to provide electrical access in either reflective or transmissive geometries.

In the write-once and erasable devices, whole individual frames of, for example, a microfiche may be erased by locally applying an electric, magnetic or shear field and heat by use of a heated stamper.

In the embodiments described above, the overcoat 8 is applied to the film 1 after the film has passed through the aligning gate 5. Also, in FIGS. 3 and 4, the film 11 coated with indium tin oxide is laminated to the strip 1 beyond the aligning gate. In each case, the operation could alternatively be carried out before the aligning gate.

It has been suggested that the process of alignment by application of a magnetic field to the polymer material might be speeded up by incorporating ferric oxide in the material. However, in the present case where the polymer material is used in a high-resolution imaging device for micrographic applications, segregation of inorganic ferric oxide particles would degrade the operation of the device. Instead, it is proposed that the applied magnetic field should be intensified to speed up the process. An intense magnetic field could be achieved by energising the magnet with single large current pulses or with bursts of pulses.

By the application of an electric field to the LCP film of such a frequency as to excite a dielectric relaxation of the LCP material, the material may be aligned into a scattering texture.

Shear alignment may be induced in the liquid crystal by shear waves generated in the film 4 by an ultrasonic transducer forming part of the aligning gate 5. Alternatively, shear alignment may be effected by passing a stream of fluid, for example air, over the surface of the liquid crystal.

Heating of the LCP material by dielectric heating may be effected by applying an a.c. electric field to the LCP film of frequency equal to or greater than the dielectric relaxation frequency of the material.

Although in the above description the materials used have been liquid crystal polymers, other materials, such as glassy nematic liquid crystals, may be used.

Under some circumstances, a combination of magnetic and/or electric and/or shear fields may be used, with or without alignment layers.

We claim:

1. A process for the manufacture of a plurality of optical storage sheets, comprising the steps of providing an elongate flexible substrate; forming an elongate film of a liquid crystalline material on said substrate; feeding said substrate with said film thereon lengthwise along a path from a first location to a second location whereby areas of the film are fed successively past aligning means positioned between said first and second locations, the aligning means being operative to apply a field to each successive area of the film to align molecules of the liquid crystalline material in each said area; and cutting the substrate with said film thereon into portions, each forming an optical storage sheet.

2. A process as claimed in claim 1, wherein the applied field comprises an electric field.

3. A process as claimed in claim 2, wherein each successive area is heated by the aligning means before application of the electric field thereto.

4. A process as claimed in claim 3, wherein the electric field is applied to each successive area by formation of a corona discharge thereover.

5. A process as claimed in claim 3, wherein the electric field is maintained during cooling of the area.

6. A process as claimed in claim 1, wherein the applied field comprises a shear field.

7. A process as claimed in claim 6, wherein the shear field is applied to the film by blade means in contact therewith.

8. A process as claimed in claim 1, wherein edges of the area are trimmed after application of the aligning field thereto.

9. A process as claimed in claim 6, wherein the substrate with the film thereon is fed in a first direction along said path; and wherein the shear field is applied to the film by roller means in contact therewith and revolving against the first direction.

10. A process as claimed in claim 1, wherein the flexible substrate comprises a web of substrate material.

11. A process as claimed in claim 1, wherein the substrate carries an electrically-conductive layer.

12. A process as claimed in claim 11, wherein the substrate has first and second opposite major surfaces, the film being deposited on said first surface, and an electrically-insulating layer and a second electrically-conductive layer being deposited on said second surface.

13. A process as claimed in claim 12, wherein the electrically-insulating layer is an elongate strip of flexible material on which the electrically-conductive layer is deposited.

14. A process as claimed in claim 1, wherein the liquid crystalline material is a liquid crystal polymer.

15. A process as claimed in claim 1, wherein a first aligning layer is applied to the substrate before formation of the film on the substrate; and wherein a strip carrying a second aligning layer is applied over the film.

16. A process as claimed in claim 15, wherein each aligning layer is a surfactant layer.

17. A process as claimed in claim 15, wherein each aligning layer is a layer of polymer.

18. A process as claimed in claim 16, wherein each aligning layer is a layer of polydimethylsiloxane.

19. A process as claimed in claim 16, wherein each aligning layer is a layer of polystyrene.

20. A process as claimed in claim 15, wherein the aligning field comprises a magnetic field.

21. A process as claimed in claim 2, wherein the electric field is accompanied by a magnetic field.

22. A process as claimed in claim 6, wherein the shear field is accompanied by a magnetic field.

23. A process as claimed in claim 15, wherein each optical storage sheet is a microfiche.

24. A process as claimed in claim 4, wherein the electric field is maintained during cooling of the area.

25. A process as claimed in claim 10, wherein the substrate carries an electrically-conductive layer.

26. Apparatus for manufacturing a plurality of optical storage sheets, comprising means for feeding an elongate flexible substrate along a feed path; means for applying an elongate film of liquid crystalline material to the substrate while the substrate is being fed along said path; aligning means operative as the film is fed past said aligning means to apply to successive areas of the film a field for aligning molecules of the liquid crystalline material in each said area; and means for cutting the substrate with the aligned field thereon into portions, each portion forming an optical storage sheet.

27. Apparatus as claimed in claim 26, wherein the applied field comprises an electric field.

28. Apparatus as claimed in claim 27, wherein the means to apply an electric field comprises corona discharge means.

29. Apparatus as claimed in claim 26, wherein the field comprises a shear field.

30. Apparatus as claimed in claim 29, wherein the means to apply the shear field comprises a blade which makes contact with the film.

31. Apparatus as claimed in claim 29, wherein the substrate with the film thereon is fed in a first direction along said feed path; and wherein the means to apply a shear field comprises roller means which makes contact with the film and which revolves against said first direction.

32. Apparatus as claimed in claim 26, wherein the film has side edges, the apparatus comprising means to trim said side edges of the film after application of the field to the film.

33. Apparatus as claimed in claim 26, comprising means to deposit the film on a flexible substrate.

34. Apparatus as claimed in claim 33, comprising a roll on which a web of the flexible substrate material is carried.

35. Apparatus as claimed in claim 33, wherein the flexible substrate carries an electrically-conductive layer.

36. Apparatus as claimed in claim 35, comprising means to deposit on the film an electrically-insulating layer carrying a second electrically-conductive layer.

37. Apparatus as claimed in claim 36, comprising a web from which the electrically-insulating layer is drawn for depositing on the film.

38. Apparatus as claimed in claim 26, wherein the film has transparency after application of the field thereto, the apparatus further comprising means for monitoring said transparency.

39. Apparatus as claimed in claim 38, wherein the monitoring means comprises at least one light emitter to pass light through the film and at least one light responsive device to receive said light.

40. Apparatus as claimed in claim 34, wherein the flexible substrate carries an electrically-conductive layer.

* * * * *